United States Patent [19]

Puryear

[11] 4,216,921
[45] Aug. 12, 1980

[54] FISHING REEL SPOOL LOCKING DEVICE

[75] Inventor: John W. Puryear, Tulsa, Okla.

[73] Assignee: Brunswick Corporation, Skokie, Ill.

[21] Appl. No.: 932,842

[22] Filed: Aug. 11, 1978

[51] Int. Cl.² ............................................ A01K 89/01
[52] U.S. Cl. ............................................... 242/84.2 R
[58] Field of Search ................. 242/84.21 R, 84.21 A, 242/84.2 R, 84.2 B, 84.5 A, 84.51 A

[56] References Cited
U.S. PATENT DOCUMENTS 2,863,617   12/1958   Chapin et al. ................. 242/84.21 R

FOREIGN PATENT DOCUMENTS 1104028   6/1955   France ................................. 242/84.2 R Primary Examiner—Billy S. Taylor
Attorney, Agent, or Firm—John G. Heimovics

[57] ABSTRACT

This invention comprehends a device for locking a fishing reel spool onto a fishing reel shaft so that there is no relative motion therebetween. Conventional spinning reels and skirted type spinning reels utilize the invention embodied herein. The unique design of this spool enables a fisherman to lock the spool on the fishing reel and not have to worry about it coming loose during fishing.

2 Claims, 7 Drawing Figures

FISHING REEL SPOOL LOCKING DEVICE

BACKGROUND OF THE INVENTION

1. Field of the Invention

This invention relates to spinning style fishing reels, and more particularly, relates to a unique device for locking a fishing reel spool onto the fishing reel.

2. Background of the Prior Art

It is well known in the prior art to have spools attached to the shaft of spinning style fishing reels whereby a fancy nut is used in front of the spool to tighten it onto the threaded end of the spool shaft. Normally, the drag assembly is located within the fishing reel spool and as a consequence the nut has to be loosened or tightened in order to make the drag operate. This presents a great hazard to fisherman in that in the event the drag is loosened too much the nut holding the spool in place starts to vibrate, loosens, falls off and then the spool falls from the fishing reel during fishing. This has proved undesirable and has frustrated fishermen over the years because of the prior art arrangement. The prior art falls to teach how a fishing reel spool can be positively locked to the fishing reel shaft.

SUMMARY OF THE INVENTION

This invention relates to a fishing reel spool locking device for conventional spinning reels and skirted style spinning reels that overcomes the difficulties of the prior art. The invention comprehends using a unique design of fishing reel spool that has a undercut groove at the face and has a free-floating knob secured to the face of the spool with a thread therein. The thread of the knob and the groove at the back of the spool are at operative association with a pin that passes through the fishing reel main shaft and the forward threaded portion thereon.

It is therefore an object of this invention to provide a fishing reel spool that is capable of being positively locked to the shaft of the fishing reel.

It is another object of this invention to provide that the spool must be properly positioned on the shaft in order for it to be tightened to the shaft.

Yet another object of this invention is the provision for interchanging spools without loosening the drag setting on the reel.

A feature of this invention is utilizing a free-floating knob with a thread therein which is secured in place to the spool and will not separate therefrom without positive action on the fisherman's part.

The obove and other and further objects and features will be more readily understood by reference to the following detailed description and the accompanying drawings.

DESCRIPTION OF THE PREFERRED EMBODIMENTS

Figure 1:
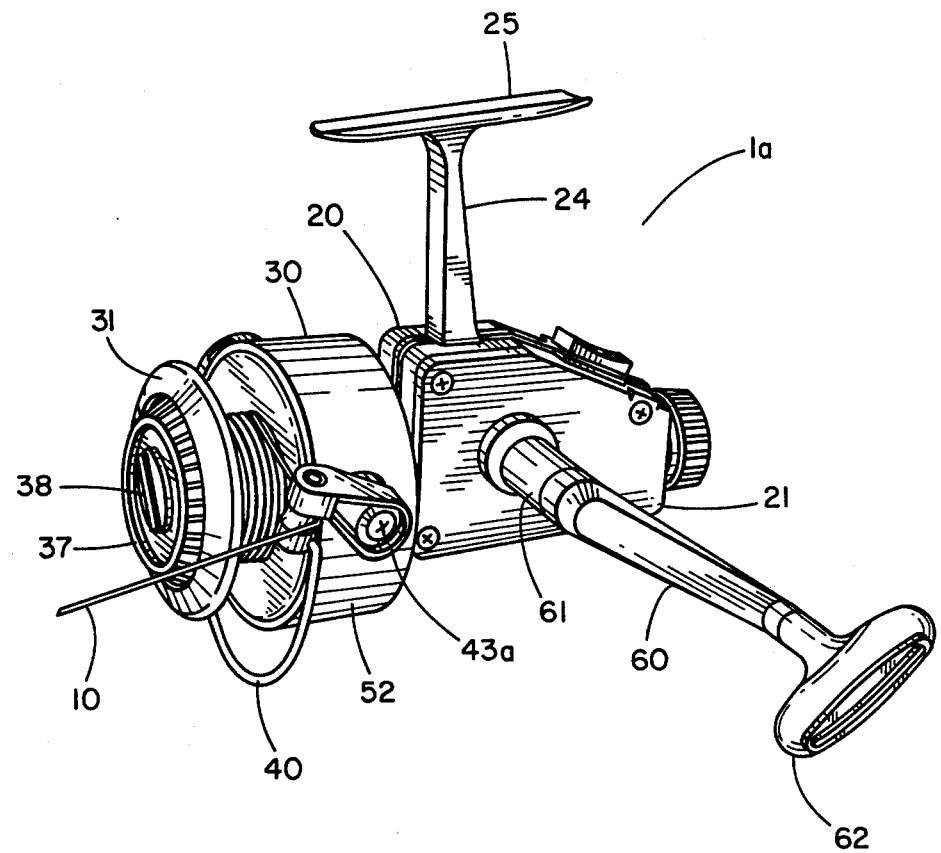
FIG. 1 is a perspective view of the conventional style spinning reel containing the invention described herein.
Figure 2:
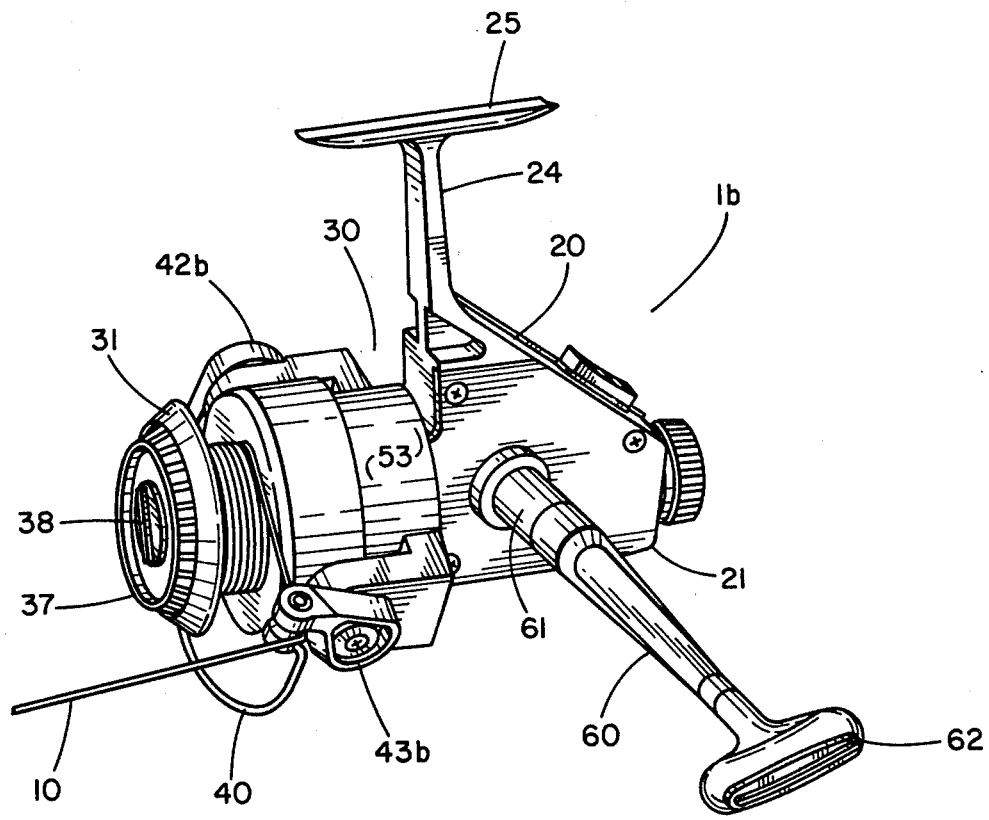
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool, as used hereinafter, the same numerals will designate the common parts for both reels; for special parts on the reels different numerical designations will be used.

The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, and 2, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 of oscillator slider 75. Rotation of the gear 73 causes the slider 75 to slide forward and backwards. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The asembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 with back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider. Thus, when the slider oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
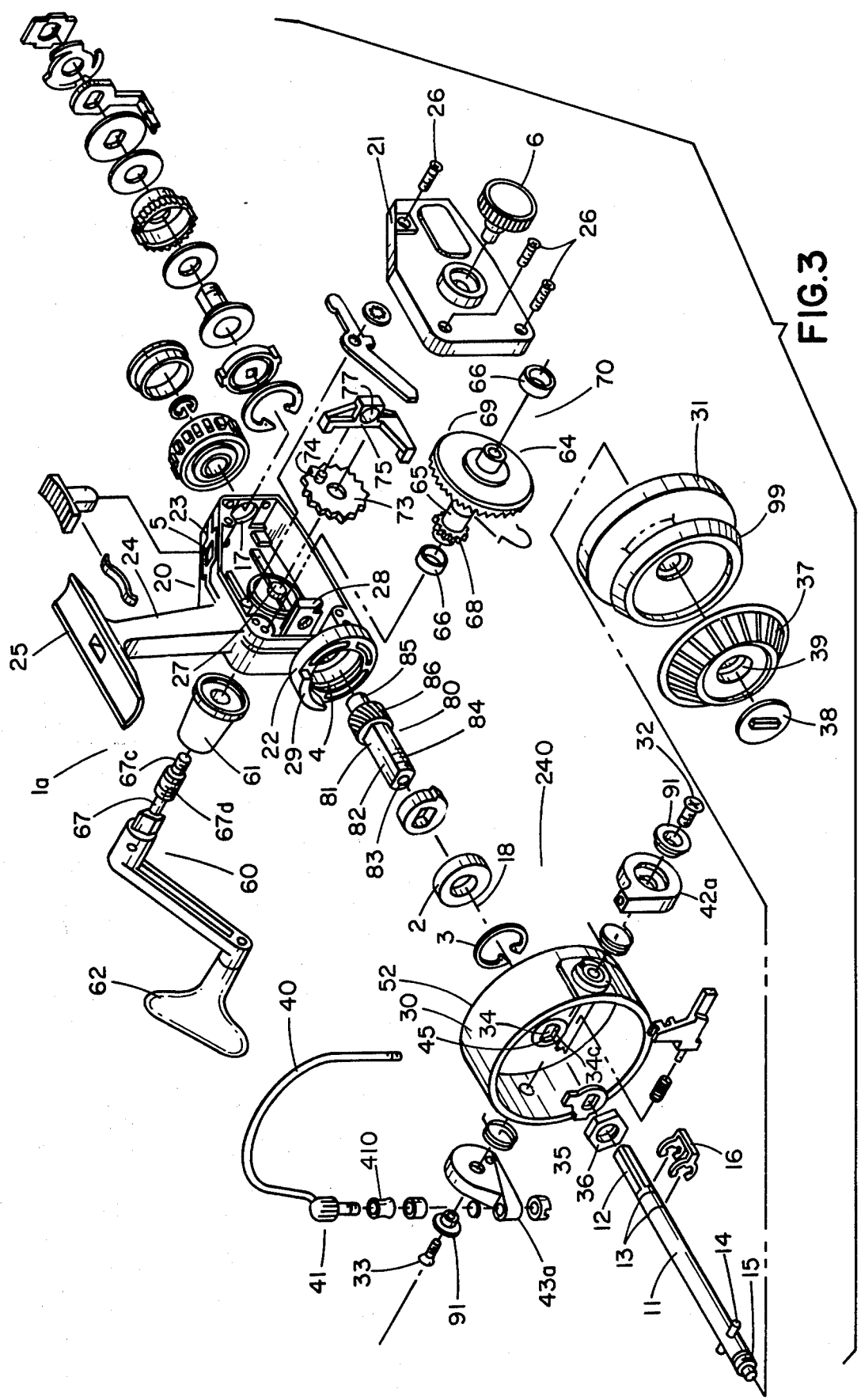
FIG. 3 is an exploded perspective view of the conventional style spinning reel containing the invention described herein.

A feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, and 3, self-centering mechanism 200 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20.

Figure 4:
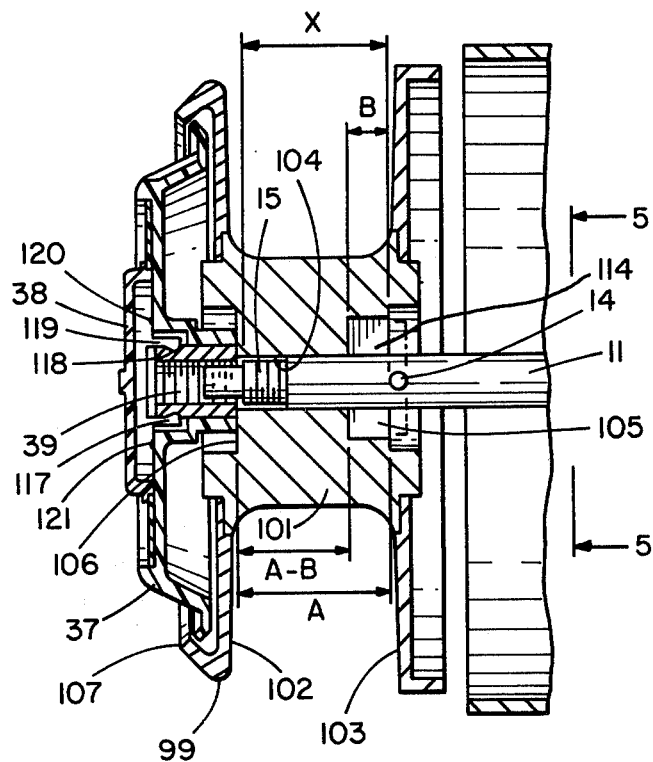
FIG. 4 is a cross sectional view of the spool mounting portion of the embodiment of this invention where the spool is not tightened on the reel shaft.

In a preferred embodiment of this invention, spool 31 is locked to the shaft 11 so that it cannot be easily removed and inadvertently become separated from the reel when a fisherman is fishing. The spool 31 comprises a front flange 102 secured to a central hub 101 which has a back flange 103 also secured to the hub 101. Front edge 107 of the flange 102 holds spool retainer knob 37 in place from inadvertently separating from the spool 31. The flange 102, hub 101 and flange 103 may be separated parts secured together or one integral part. The knob 37 supporting cover 38 has a central threaded portion 39 that has a mating thread to that of the shaft thread 15. Hub 101 has a central hole 104 that is concentric with the spool and is used for mounting the spool 31 on shaft 11. At the back of the hub 101 is an undercut groove 105 that is transverse to the hole 104 and extends radially outwardly therefrom. The front of the hub 101 has undercut portion 106 for accommodating the downwardly projecting threaded portion 39 and a back cylinder undercut section 114. The thickness of the hub 101 between the undercut face 106 and the back cylindrical undercut section 114 is "A" as seen in FIG. 4. The depth of the undercut groove 105 is a distance "B". The distance from the bottom of the groove 105 to the face 106 is "A-B".

Figure 5:
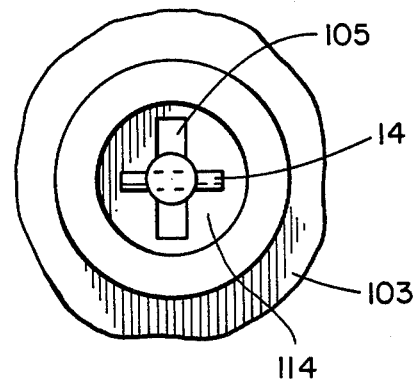
FIG. 5 is a partial back section view of FIG. 4.
Figure 6:
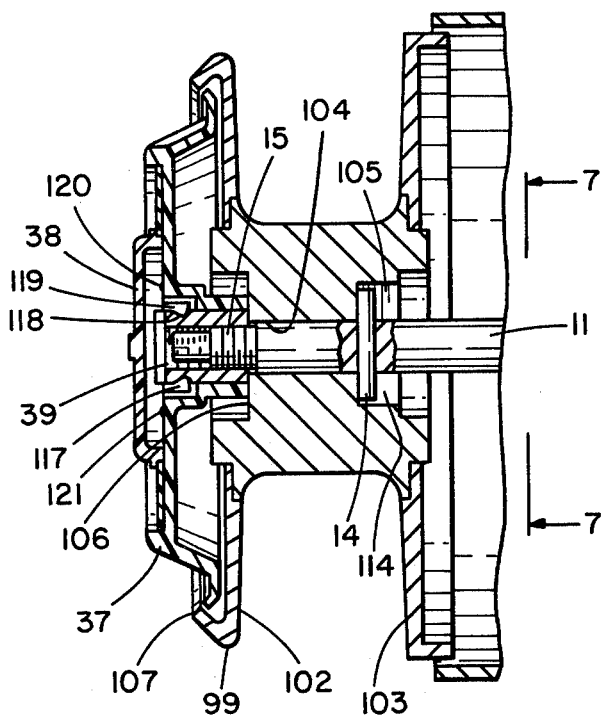
FIG. 6 is a partial cross sectional view of the spool of the fishing reel as it is locked in place on the shaft; and, FIG. 7 is a partial cross sectional view of FIG. 6.
Figure 7:
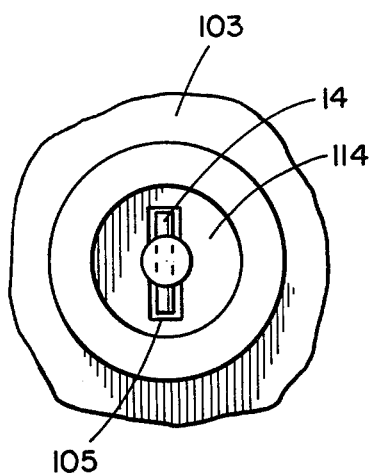

The distance from the pin 14 to the thread 15 on the shaft 11 is a distance X which is greater than "A-B" but less than "A". When the spool 31 is placed on the shaft 11 and the groove 105 and the pin 14 do not coincide, as shown in FIGS. 4 and 5, then the threaded portion 39 cannot reach the thread 15 and obviously the spool 31 cannot be tightened on the shaft 11 because the length "X" is less than the thickness "A". when the spool 31 is rotated and the pin 14 fits into and corresponds with groove 105, there is a positive clicking sound. In this position the thread 39 of the knob 37 can be tightened on the thread 15 because the length "X" is greater than "A-B" and, thus, the spool 31 locked in place on the reel. The mating of the groove 105 and the pin 14 prevents any relative movement between the shaft 11 and the spool 31. The spool 31 is secured in position as depicted in FIGS. 10 and 11. This invention is applicable to both the conventional and skirted spinning reels.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, the improvement comprising:

(a) a spool having a hub and front and back flanges mounted concentrically with the hub, and a center concentric hole passing therethrough, the hub having an undercut front face and an undercut back section each surrounding the center hole, the distance from the undercut back section of the hub to the front undercut face of the hub being A, the spool having a groove undercut into the undercut back section a depth B and the groove being transverse the hole and extending radially therefrom, the distance from the groove to the front face of the hub being A-B, (b) a retainer knob having a central threaded portion, the retainer rotatably mounted on the spool and retained by the front flange with the threaded portion in axial alignment with the center hole, (c) the shaft having a forward threaded end, a pin passing through said shaft, a distance X from the pin to the forwardmost thread being less than A and being greater than the distance A-B, to lock the spool to the shaft, the spool must be rotated permitting the pin to fit into the groove enabling the threaded portion on the knob to engage the threaded end of the shaft.

2. The reel of claim 1 wherein the front flange is bent inwardly forming a lip over the knob to prevent the separation of the knob and the spool.

* * * * *